US012623253B2

(12) United States Patent
Chen et al.

(10) Patent No.: US 12,623,253 B2
(45) Date of Patent: May 12, 2026

(54) ARTICLE SORTING APPARATUS AND ARTICLE SORTING SYSTEM

(71) Applicant: BEIJING JINGDONG QIANSHI TECHNOLOGY CO., LTD., Beijing (CN)

(72) Inventors: Ying Chen, Beijing (CN); Jian Zhang, Beijing (CN); Xu Liu, Beijing (CN); Tao Mei, Beijing (CN); Yunjian Cheng, Beijing (CN); Xianglong Wang, Beijing (CN)

(73) Assignee: BEIJING JINGDONG QIANSHI TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/729,362

(22) PCT Filed: Jan. 18, 2023

(86) PCT No.: PCT/CN2023/072765
§ 371 (c)(1),
(2) Date: Jul. 16, 2024

(87) PCT Pub. No.: WO2023/207231
PCT Pub. Date: Nov. 2, 2023

(65) Prior Publication Data

US 2025/0083189 A1 Mar. 13, 2025

(30) Foreign Application Priority Data

Apr. 29, 2022 (CN) ......................... 202210467393.1

(51) Int. Cl.
*B07C 3/02* (2006.01)
*B07C 5/36* (2006.01)

(52) U.S. Cl.
CPC .................. *B07C 3/02* (2013.01); *B07C 5/36* (2013.01); *B07C 2501/0063* (2013.01)

(58) Field of Classification Search
CPC .............. B07C 3/02; B07C 3/06; B07C 5/362
(Continued)

(56) References Cited

U.S. PATENT DOCUMENTS 6,634,485 B1 * 10/2003 Cailbault ............... B65G 69/16 198/417
8,919,529 B1 * 12/2014 Erceg ................... B65G 47/962 198/360
(Continued)

FOREIGN PATENT DOCUMENTS

CN 206720106 U 12/2017
CN 208054365 U 11/2018
(Continued)

OTHER PUBLICATIONS

Li; Guiping, "Test Tube Sorting Device's Letter Sorting Mechanism" (English Translation), Dec. 8, 2017, worldwide.espacenet.com (Year: 2017).*
(Continued)

*Primary Examiner* — Michael McCullough
*Assistant Examiner* — Molly K Devine
(74) *Attorney, Agent, or Firm* — Myers Bigel, P.A.

(57) ABSTRACT

The present disclosure relates to an article sorting apparatus and an article sorting system, wherein the article sorting apparatus includes a first receiving means and a second receiving means which are both configured to receive an article, wherein the second receiving means is arranged below the first receiving means along a vertical direction; a transfer means arranged upstream of the second receiving means for transferring a received article to the second receiving means; and a sorting member for sorting the article
(Continued)

to the first receiving means or the transfer means. The article sorting system includes an article sorting apparatus. The first receiving means and the second receiving means are arranged longitudinally along a vertical direction, which reduces the occupied space of the article sorting apparatus and allows for more space for article storage.

12 Claims, 7 Drawing Sheets

(58) Field of Classification Search
USPC .......................................................... 209/509
See application file for complete search history.

(56) References Cited

U.S. PATENT DOCUMENTS

| | | | | |
|---|---|---|---|---|
| 10,583,986 | B2 * | 3/2020 | Wagner | B65G 1/1376 |
| 10,796,116 | B2 * | 10/2020 | Wagner | B07C 5/3412 |
| 2017/0136632 | A1 | 5/2017 | Wagner et al. | |
| 2017/0157649 | A1 * | 6/2017 | Wagner | B07C 3/082 |
| 2019/0022702 | A1 * | 1/2019 | Vegh | B07C 3/006 |

FOREIGN PATENT DOCUMENTS

| | | | |
|---|---|---|---|
| CN | 109804947 | A | 5/2019 |
| CN | 209736092 | U | 12/2019 |
| CN | 210995339 | U | 7/2020 |
| CN | 111774313 | A | 10/2020 |
| CN | 213194618 | U | 5/2021 |
| CN | 213762886 | U | 7/2021 |
| CN | 113291682 | A | 8/2021 |
| CN | 114850041 | A | 8/2022 |
| CN | 217512326 | U | 9/2022 |

OTHER PUBLICATIONS

International Search Report corresponding to PCT/CN2023/072765; Mailed Apr. 29, 2023, (8 pages, including English translation).

First Examination Opinion Notification and English language translation, CN Application No. 202210467393.1, Jun. 13, 2025, 22 pp.

* cited by examiner

ARTICLE SORTING APPARATUS AND ARTICLE SORTING SYSTEM

CROSS-REFERENCE TO RELATED APPLICATIONS

The present application is a U.S. National Stage Application under 35 U.S.C. § 371 of International Patent Application No. PCT/CN2023/072765, filed on Jan. 18, 2023, which itself claims priority to CN Patent application Ser. No. 20/221,0467393.1 filed on Apr. 29, 2022, the disclosures of both of which are incorporated by reference herein in their entireties.

TECHNICAL FIELD

The present disclosure relates to the technical field of logistics transportation, in particular to an article sorting apparatus and an article sorting system.

BACKGROUND

With the boom of the logistics industry, the article sorting demand rises abruptly. In the logistics distribution center, a product is first picked out from its storage location or other positions according to an order requirement of a customer or a distribution plan, and then packaged and delivered.

At present, in a warehoused article sorting, it is necessary to pick out a product from a target container and allocate the same to a designated target container. Since the sorting is accomplished by manual, a worker needs to turn around repeatedly to pick up a product, which involves repetitive work. Thus, the worker is prone to fatigue and it is difficult to work continuously. Moreover, manual sorting requires consuming a lot of labor, which increases the labor cost.

It is to be noted that, the information in the portion of background art of the present disclosure is merely intended to enhance the understanding of the overall background of the present disclosure, but shall not be construed as admitting or hinting in any form that the information constitutes the art already commonly known by those skilled in the art.

SUMMARY

The present disclosure provides an article sorting apparatus and an article sorting system, which may realize automatic sorting and reduce labor cost.

According to one aspect of the present disclosure, an article sorting apparatus is provided. The apparatus comprises: a first receiving means for receiving an article; a second receiving means for receiving an article, the second receiving means is arranged below the first receiving means along a vertical direction; a transfer means arranged upstream of the second receiving means for transferring a received article to the second receiving means; and a sorting member for sorting the article to the first receiving means or the transfer means.

In some embodiments, a receiving port of the transfer means and a receiving port of the first receiving means are located on both sides of the sorting member respectively and substantially at the same height.

In some embodiments, the sorting member includes a spindle and a tipping bucket rotatably mounted on the spindle, and when the tipping bucket rotates to a first state, the article in the tipping bucket slides into the first receiving means; and when the tipping bucket rotates to a second state, the article in the tipping bucket slides into the transfer means.

In some embodiments, the sorting member includes a conveying body and a conveyor belt, the conveyor belt conveys the article along a straight line, the conveyor belt moves along a first direction to convey the article to the first receiving means, and the conveyor belt moves along a second direction opposite to the first direction to convey the article to the transfer means.

In some embodiments, the transfer means includes a vertical section and a slanted section communicating with each other, the slanted section communicates with the second receiving means.

In some embodiments, the article sorting apparatus further comprises a buffer means for reducing an impact force after the article arrives at the second receiving means.

In some embodiments, the buffer means includes a mounting frame and a plurality of flexible belts mounted on the mounting frame.

In some embodiments, the first receiving means and the second receiving means are provided with a plurality of receiving stations sequentially arranged along a horizontal direction respectively, and the sorting member is movably arranged relative to the first receiving means and the second receiving means along a horizontal direction so that the sorting member sorts the article to the different receiving stations of the first receiving means and the different receiving stations of the second receiving means.

In some embodiments, the article sorting apparatus further comprises a first baffle arranged on a side of the sorting member for guiding the article deflecting before arriving at the sorting member into the sorting member.

In some embodiments, the article sorting apparatus further comprises a first support frame including a first support frame and a second support frame located below the first support frame, a plurality of first receiving containers for receiving the article are arranged on the first support frame, so that the plurality of the first receiving containers and the first bracket form the first receiving means; and a plurality of second receiving containers for receiving the article are arranged on the second bracket, so that the plurality of second receiving containers and the second bracket form the second receiving means In some embodiments, the first support frame further includes a third bracket arranged on a side of the first bracket and the second bracket, the transfer means is arranged on the third bracket, and the sorting member is arranged on the top of the third bracket proximate to the side of the first bracket.

According to another aspect of the present disclosure, an article sorting system is provided. The system comprises the above-described article sorting apparatus.

In some embodiments, the article sorting system further comprises a first conveying means and a robot, the first conveying means is configured to convey the article to be sorted, the robot is arranged above the first conveying means, the article sorting apparatus is arranged on a side of the first conveying means, and the robot is configured to transfer the article from the first conveying means to the sorting member.

In some embodiments, the article sorting system further comprises a second conveying means and a third conveying means, which both communicate with the first conveying means, the second conveying means is configured to convey a bin to the first conveying means, the bin is configured to store the article to be sorted, and the third conveying means is configured to receive the bin from the first conveying means.

In some embodiments, the numbers of the second conveying means and the third conveying means are both two, two of the second conveying means are arranged in parallel, and two of the third conveying means are arranged in parallel.

In some embodiments, the article sorting system further comprises a second baffle arranged between the article sorting apparatus and the first conveying means for guiding the article that fails to enter the sorting member to the first conveying means.

Based on the above-described technical solution, in the embodiment provided by the present disclosure, an article to be sorted is sorted to a first receiving means or a second receiving means by a sorting member, thereby realizing automatic article sorting instead of manual work and avoiding repetitive work, which is also conductive to reduce the labor cost. Wherein, the article sorted to the second receiving means may be first sorted into a transfer means, and then transferred to the second receiving means through the transfer means. By providing the transfer means, it is convenient to implement arranging the first receiving means and the second receiving means longitudinally along a vertical direction, which is conductive to saving the occupied space of the first receiving means and the second receiving means, thereby lessening the overall occupied space of the article sorting apparatus and allowing more space for article storage.

BRIEF DESCRIPTION OF THE DRAWINGS

The accompanying drawings described here which are intended to provide a further understanding of the present disclosure, constitute a part of the present application. The illustrative embodiments of the present disclosure as well as the descriptions thereof, which are intended for explaining the present disclosure, do not constitute improper definitions on the present disclosure. In the accompanying drawings.

In the accompanying drawings.

10. first receiving means; 11. first bracket; 12. first receiving container; 20. second receiving means; 21. second bracket; 22. second receiving container; 23. buffer means; 30. transfer means; 31. vertical section; 32. slanted section; 40. sorting member; 41. spindle; 42. tipping bucket; 43. conveying body; 44. conveyor belt; 50. first baffle; 61. third bracket; 70. second baffle; 80. guide rail; 90. first detection means; 100. first conveying means; 110. robot; 111. second support frame; 112. robotic arm; 113. first end pickup; 114. second end pickup; 120. second conveying means; 130. third conveying means; 140. second detection means; 141. third support frame; 150. bin.

DETAILED DESCRIPTION

The technical solution in the embodiments will be explicitly and completely described below in conjunction with the accompanying drawings in the embodiments of the present disclosure. Apparently, the described embodiments are merely some of the embodiments of the present disclosure, rather than all the embodiments. Based on the embodiments of the present disclosure, all the other embodiments obtained by those of ordinary skill in the art on the premise that no inventive effort is involved pertain to the protection scope of the present disclosure.

In the description of the present disclosure, it is necessary to understand that, the azimuth or positional relations indicated by the terms “center”, “transverse”, “longitudinal”, “front”, “rear”, “left”, “right”, “up”, “down”, “vertical”, “horizontal”, “top”, “bottom”, “within”, “outside”, which are based on the azimuth or positional relations illustrated by the drawings, are only for facilitating description of the present disclosure and simplifying the description, rather than indicating or implying that the device or element referred thereto has to present a particular orientation, and be constructed and operated in a particular orientation, so that it cannot be understood as limiting the protection scope of the present disclosure.

Figure 1:
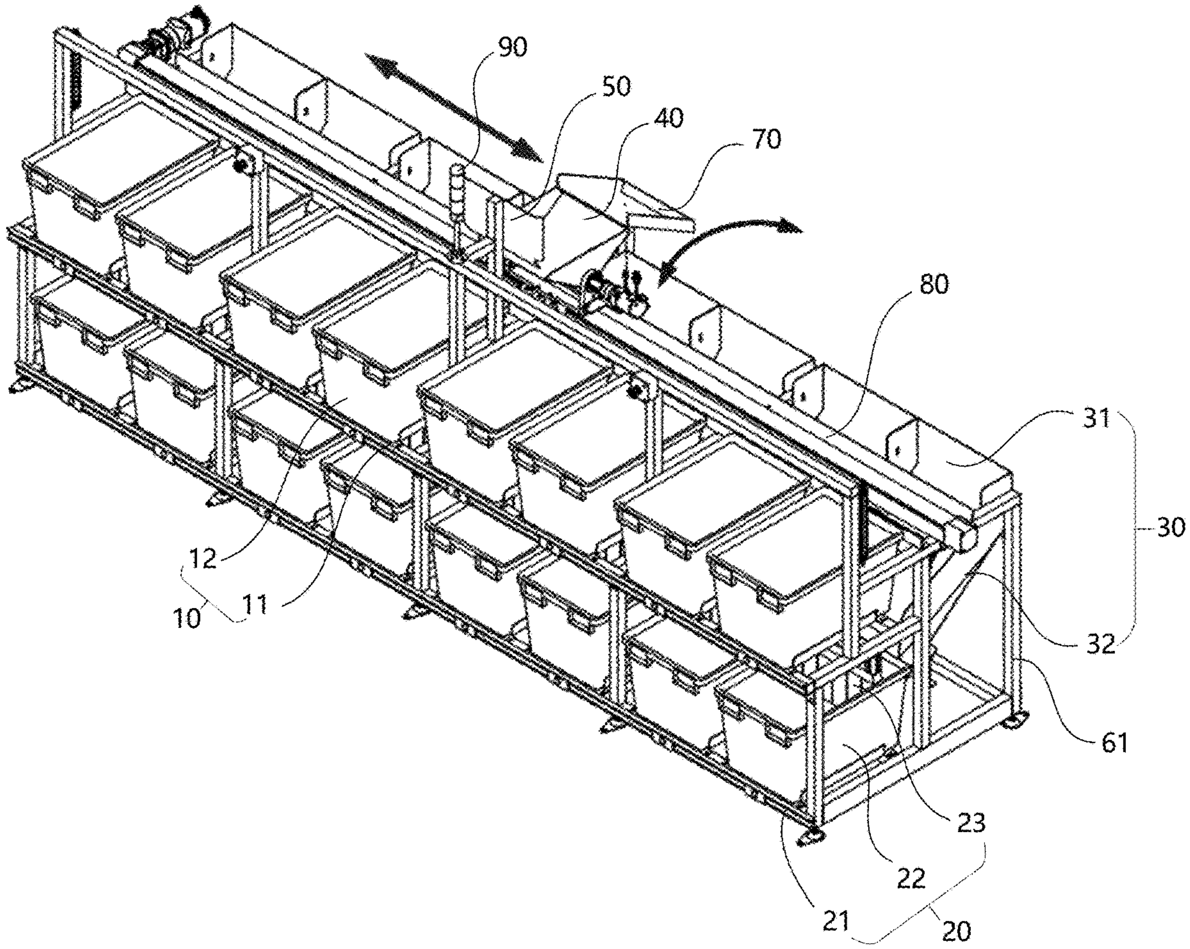
FIG. 1 is a schematic structural view of one embodiment of the article sorting apparatus according to the present disclosure at a first angle.
Figure 2:
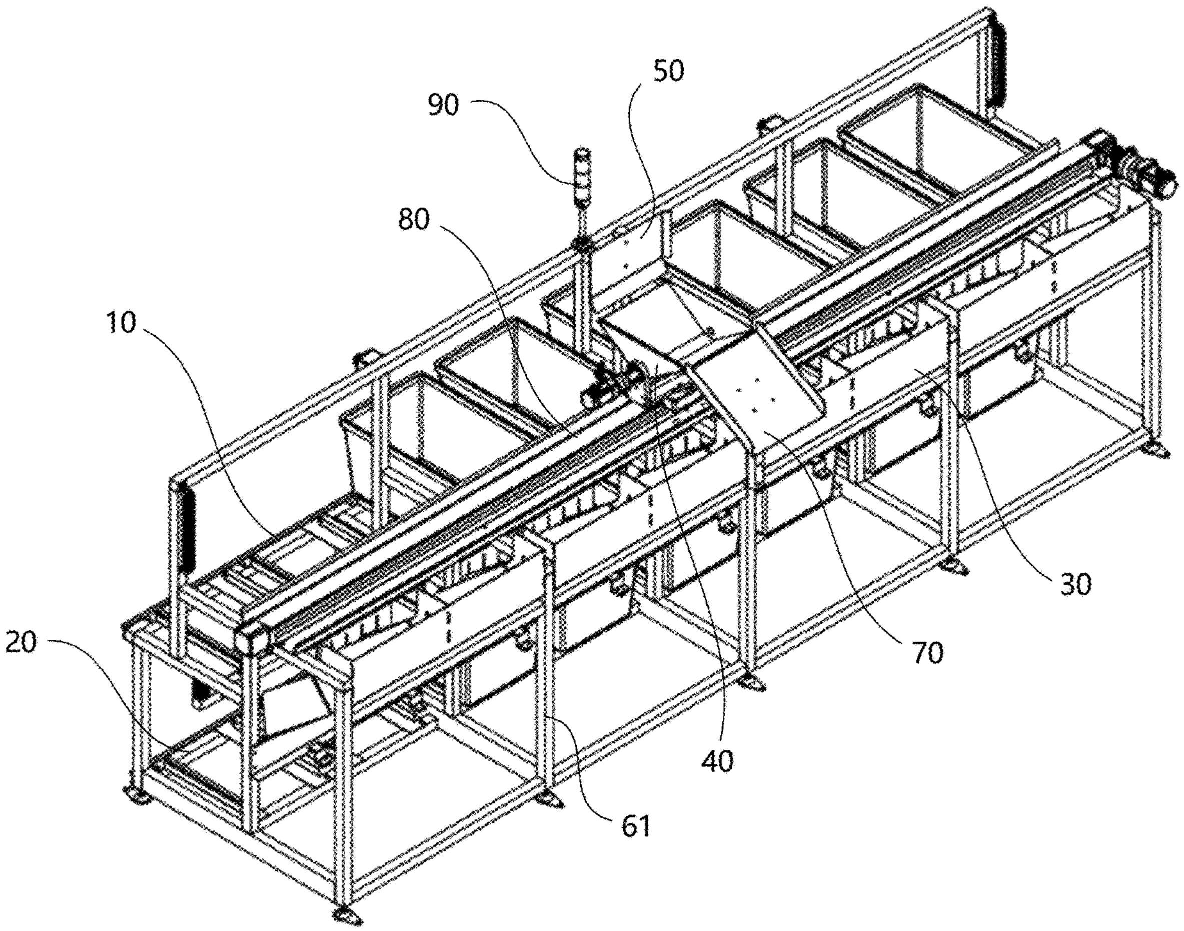
FIG. 2 is a schematic structural view of one embodiment of the article sorting apparatus according to the present disclosure at a second angle.

As shown in FIGS. 1 and 2, in some embodiments of the article sorting apparatus according to the present disclosure, the article sorting apparatus comprises a first receiving means 10, a second receiving means 20, a transfer means 30 and a sorting member 40, the first receiving means 10 and the second receiving means 20 are both configured to receive an article, the second receiving means 20 is arranged below the first receiving means 10 along a vertical direction, the transfer means 30 is arranged upstream of the second receiving means 20 for transferring a received article to the second receiving means 20, and the sorting member 40 is for sorting an article to the first receiving means 10 or the transfer means 30.

The first receiving means 10 and the second receiving means 20 may serve as an intermediate storage station before package and delivery, so as to temporarily store a sorted article. The first receiving means 10 and the second receiving means 20 may also serve as a final storage station before package and delivery. After an article is sorted into the first receiving means 10 or the second receiving means 20, it is possible to directly enter a package and delivery progress, so that all the articles received by the first receiving means 10 are packaged and delivered, and all the articles received by the second receiving means 20 are packaged and delivered.

In the above-described embodiments, an article to be sorted is sorted to a first receiving means 10 or a second receiving means 20 by a sorting member 40, thereby realizing automatic article sorting instead of manual work and avoiding repetitive work, which is also conductive to reduce the labor cost. The article sorted to the second receiving means 20 may be first sorted into a transfer means 30, and then transferred to the second receiving means 20 through the transfer means 30. By providing the transfer means 30, it is convenient to implement arranging the first receiving means 10 and the second receiving means 20 longitudinally along a vertical direction, which is convenient to saving the occupied space of the first receiving means 10 and the second receiving means 20, thereby lessening the overall occupied space of the article sorting apparatus and allowing more space for article storage.

Figure 3:
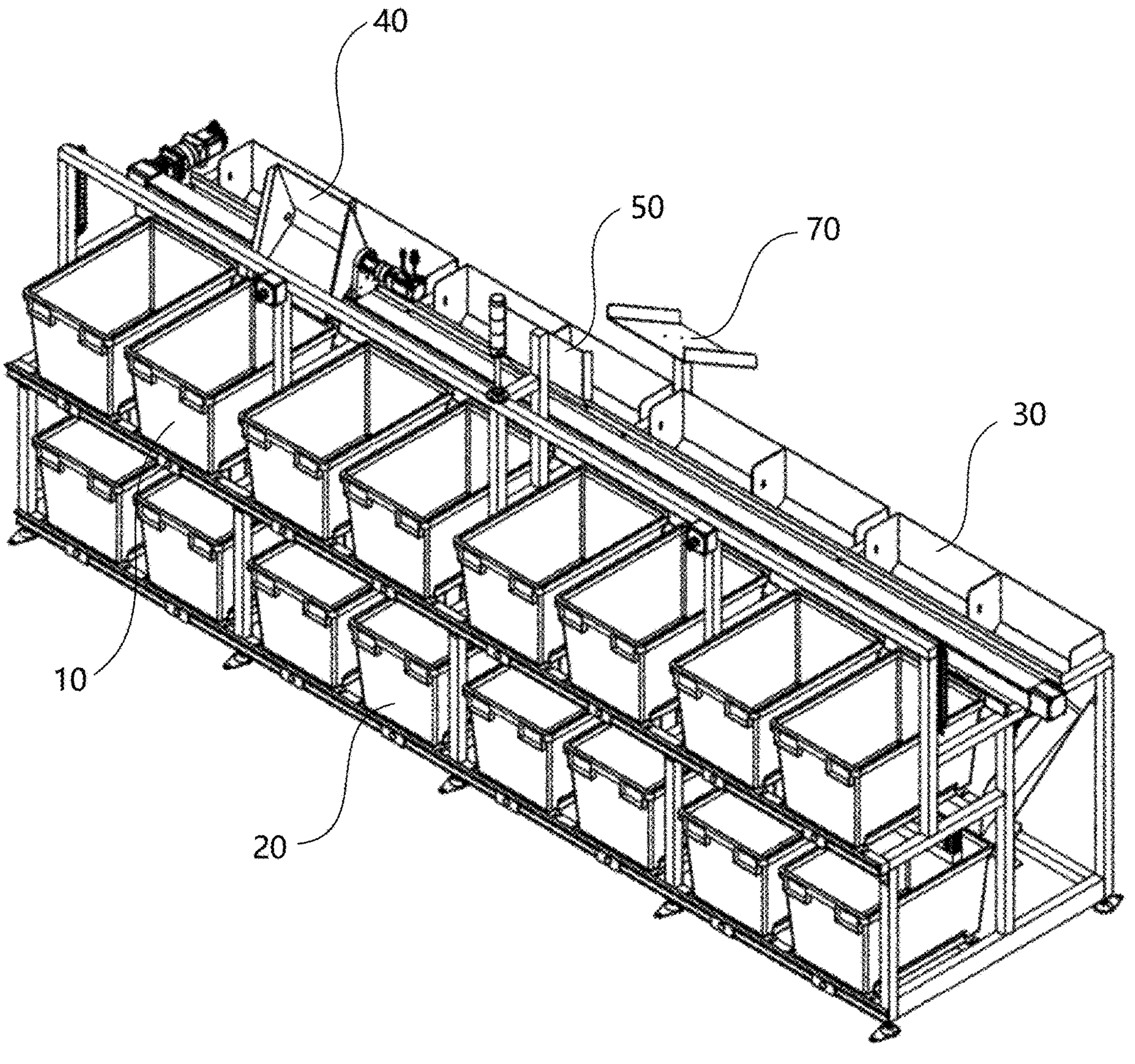
FIG. 3 is a schematic structural view of the sorting member in a first state in one embodiment of the article sorting apparatus according to the present disclosure.
Figure 4:
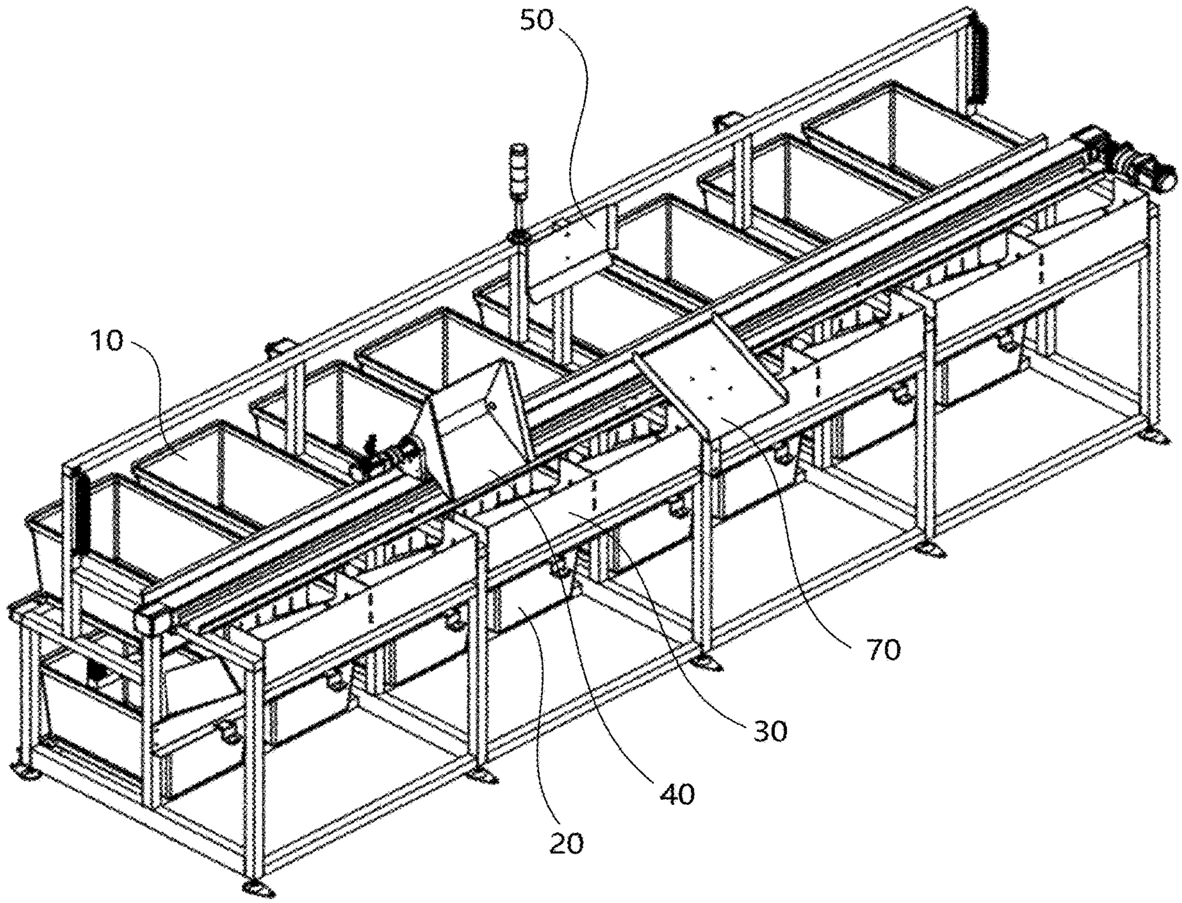
FIG. 4 is a schematic structural view of the sorting member in a second state in one embodiment of the article sorting apparatus according to the present disclosure.

As shown in FIGS. 3 and 4, in some embodiments, a receiving port of the transfer means 30 and a receiving port of the first receiving means 10 are located on both sides of the sorting member 40 respectively and substantially at the same height. The advantage of this arrangement is that, it is convenient to arrange the sorting member 40 at the same height as a receiving port of the transfer means 30 and a receiving port of the first receiving means 10, so as to facilitate realizing the object of sorting an article to the first receiving means 10 or the second receiving means 20 through the movement of the sorting member 40 itself.

Figure 5:
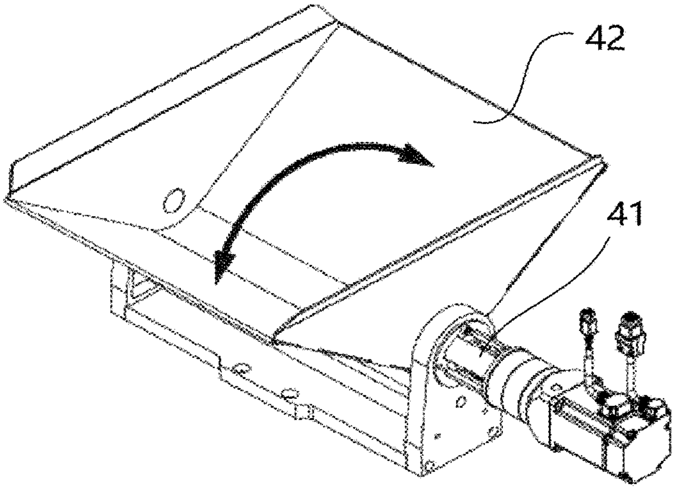
FIG. 5 is a structural schematic view of the sorting member in one embodiment of the article sorting apparatus according to the present disclosure.

As shown in FIG. 5, in some embodiments, the sorting member 40 includes a spindle 41 and a tipping bucket 42 rotatably mounted on the spindle 41. When the tipping bucket 42 rotates to a first state, the article in the tipping bucket 42 slides into the first receiving means 10. When the tipping bucket 42 rotates to a second state, the article in the tipping bucket 42 slides into the transfer means 30.

The tipping bucket 42 rotates around the spindle 41, so that it is possible to implement switching the tipping bucket 42 between the first state and the second state. As shown in FIG. 3, in the first state, the outlet of the tipping bucket 42 is slanted to a receiving port of the first receiving means 10, so that the article slides from the tipping bucket 42 into the first receiving means 10. As shown in FIG. 4, in the second state, the outlet of the tipping bucket 42 is slanted to a receiving port of the transfer means 30, so that the article slides from the tipping bucket 42 into the transfer means 30.

The tipping bucket 42 has a roughly V-shaped accommodating space, which structure has a large opening, so as to allow an article with a large size to enter. Moreover, this structure is also beneficial to realize the docking with the first receiving means 10 or the transfer means 30 on both sides respectively by way of rotation.

Figure 6:
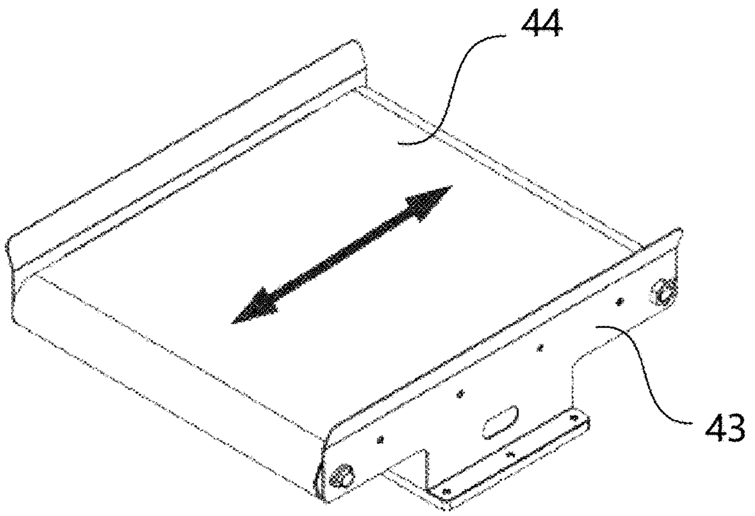
FIG. 6 is a schematic structural view of the sorting member in another embodiment of the article sorting apparatus according to the present disclosure.

As shown in FIG. 6, in some embodiments, the sorting member 40 includes a conveying body 43 and a conveyor belt 44, the conveyor belt 44 conveys an article along a straight line, the conveyor belt 44 moves along a first direction to convey an article to the first receiving means 10, and the conveyor belt moves along a second direction opposite to the first direction to convey an article to the transfer means 30. The conveyor belt 44 moves along two opposite directions to realize the object of conveying an article to the first receiving means 10 or the transfer means 30.

In some embodiments, the transfer means 30 includes a vertical section 31 and a slanted section 32 communicating with each other, and the slanted section 32 communicates with the second receiving means 20.

A received article may be conveyed downwards rapidly by the vertical section 31. By means of the slanted section 32, the article may be guided to change a direction to fall into the second receiving means 20 located below the first receiving means 10.

In some embodiments, the article sorting apparatus further comprises a buffer means 23 for reducing an impact force after the article arrives at the second receiving means 20.

It is possible to reduce an impact force after the article arrives at the second receiving means 20 by means of the buffer means 23, so as to prevent the article from rushing out of the second receiving means 20 due to inertia force, or prevent the article from colliding with other articles on the second receiving means 20 due to inertia force.

In some embodiments, the second receiving means 20 includes a second receiving container 22 and a buffer means 23 arranged within the second receiving container 22, and the buffer means 23 is configured to reduce an impact force after the article enters the second receiving container 22.

It is possible to reduce an impact force after the article enters the second receiving container 22 by means of the buffer means 23, so as to prevent the article from intensely colliding with an interior wall of the second receiving container 22 or other articles within the second receiving container 22, and effectively protect the article, the second receiving container 22 or other articles.

In some embodiments, the buffer means 23 includes a mounting frame and a plurality of flexible belts mounted on the mounting frame. The plurality of flexible belts forms a blocking curtain, which may slow down the article and effectively cushion the article, without completely blocking the movement of the article.

The flexible belt may be made from a material such as rubber. The plurality of flexible belts may be arranged in parallel, and there may be a gap or not between two adjacent flexible belts.

In some embodiments, the first receiving means 10 and the second receiving means 20 are provided with a plurality of receiving stations sequentially arranged along a horizontal direction respectively, and the sorting member 40 is movably arranged relative to the first receiving means 10 and the second receiving means 20 along a horizontal direction, so that an article is sorted to different receiving stations of the first receiving means 10 and the second receiving means 20 through the sorting member 40.

By providing a plurality of receiving stations, and providing the sorting member 40 to be movable relative to the first receiving means 10 and the second receiving means 20 along a horizontal direction, it is possible to implement simultaneously or continuously receiving at a plurality of receiving stations. For example, when a plurality of orders all includes an article, the article may be picked up from a bin where the article is stored consecutively for multiple times and sorted to different receiving means sequentially, thereby saving the time of waiting for the receiving means to be vacated and replenished, and further greatly improving the sorting efficiency.

In some embodiments, the article sorting apparatus further includes a guiding mechanism for guiding the movement of the sorting member 40.

The guiding mechanism may include a guide rail 80, and the sorting member 40 is slidably engaged with the guide rail 80, so that the sorting member 40 slides along the guide rail 80. The extending direction of the guide rail 80 is parallel to the arrangement direction of a plurality of receiving stations of the first receiving means 10, so as to implement switching the sorting member 40 among the plurality of receiving stations.

In some embodiments, the article sorting apparatus further comprises a first baffle 50 arranged on a side of the sorting member 40 for guiding an article deflecting before arriving at the sorting member 40 into the sorting member 40.

By providing the first baffle 50, the article may be guided into the sorting member 40, so as to prevent an article from falling beyond the sorting member 40, which results in a failure such as shutdown.

As shown in FIG. 2, the first baffle 50 is substantially arranged vertically at a front end of a feeding direction of an article to prevent an article from falling off. When the sorting member 40 is in a third state of receiving an article, the sorting member 40 does not turn over at this time, and the first baffle 50 is arranged directly in front of the sorting member 40. When the article falls slightly beyond the sorting member 40, it may be guided into the sorting member 40 through the first baffle 50.

In some embodiments, the first baffle 50 includes a first plate arranged vertically, a second plate and a third plate obliquely connected to both sides of the first plate, and a fourth plate obliquely connected below the first plate, the second and third plates are configured to guide an article to the middle, and the fourth plate is slanted relative to the first plate in a direction approaching the inlet of the sorting member 40 so as to guide the article into the sorting member 40.

In some embodiments, the article sorting apparatus further comprises a first support frame including a first support frame 11 and a second support frame 21 located below the first support frame 11. A plurality of first receiving containers 12 for receiving an article are arranged on the first support frame 11, so that the first support frame 11 and the plurality of first receiving containers 12 form the first receiving means 10. A plurality of second receiving containers 22 for receiving an article are arranged on the second support frame 21, so that the second support frame 21 and the plurality of second receiving containers 22 form the second receiving means 20.

In some embodiments, the article sorting apparatus further comprises a first support frame, a plurality of first receiving containers 12 and a plurality of second receiving containers 22. The first support frame comprises a first support frame 11 and a second support frame 21 located below the first support frame 11. The plurality of first receiving containers 12 are arranged on the first bracket 11, so that the first bracket 11 and the plurality of first receiving containers 12 form the first receiving means 10. The plurality of second receiving containers 22 are arranged on the second bracket 21, so that the second bracket 21 and the plurality of second receiving containers 22 form the second receiving means 20.

In the present disclosure, one part of the first support frame (i.e., the first bracket 11) and the plurality of first receiving containers 12 are used to form the first receiving means 10, and the other part of the first support frame (i.e., the second bracket 21) and the plurality of second receiving containers 22 are used to form the second receiving means 20. The first bracket 11 in the first receiving means 10 and the second bracket 21 in the second receiving means 20 are both part of the first bracket, so that the first receiving means 10 and the second receiving means 20 may be arranged on the same bracket, which is conductive to improve the stability of the first receiving means 10 and the second receiving means 20 and also save the space at the same time.

The first receiving container 12 may be fixedly mounted on the first bracket 11 or detachably mounted on the first bracket 11, so as to realize the object of moving an article by moving the first receiving container 12 after the first receiving container 12 is filled with articles. The second receiving container 22 may be fixedly mounted on the second bracket 21 or detachably mounted on the second bracket 21, so as to realize the object of moving an article by moving the second receiving container 22 after the second receiving container 22 is filled with articles.

By means of the first receiving container 12 and the second receiving container 22, the article may be carried by the first receiving container 12 and the second receiving container 22 during the circulation process, so as to avoid damage of the article. Moreover, the first receiving container 12 and the second receiving container 22 may also carry a plurality of articles at one time, thereby realizing simultaneous circulation of a plurality of articles. Of course, in some embodiments, the first receiving container 12 and the second receiving container 22 may be neglected, and the article may be directly circulated between various conveying means and transfer means.

In some embodiments, the article sorting apparatus further comprises a first detection member for detecting an attendance condition of the first receiving container 12 on the first bracket 11 or whether the first receiving container 12 is placed at a correct position, and a second detection member for detecting an attendance condition of the second receiving container 22 on the second bracket 21 or whether the second receiving container 22 is placed at a correct position, so as to inform the sorting member 40 whether an article may be dropped into a corresponding receiving container.

In some embodiments, the first support frame further includes a third support frame 61 arranged on a side of the first support frame 11 and the second support frame 21, the transfer means 30 is arranged on the third support frame 61, and the sorting member 40 is arranged on the top of the third support frame 61 proximate to a side of the first support frame 11.

The third bracket 61 is arranged on one side of the first bracket 11 and the second bracket 21 side by side. The third bracket 61 is configured to support the transfer means 30. At the same time, the third bracket 61 is connected integrally with the first bracket 11 and the second bracket 21 to form a complete first support frame, which is conductive to improve the stability of the whole article sorting apparatus. If the sorting member 40 is arranged on the top of the third support frame 61 proximate to a side of the first support frame 11, it is possible to conveniently realize the docking with the first receiving means 10 and the transfer means 30 respectively by the movement of the sorting member 40 itself.

In some embodiments, the article sorting apparatus further comprises a first detection means 90 for detecting whether an object enters a movement path of the sorting member 40, and stopping the movement of the sorting member 40 when it is detected that an object enters, so as to protect the safety of a worker and an article.

The first detection means 90 may use a safety light curtain or the like.

In some embodiments, the first support frame is provided with an emergency stop button for stopping the movement of the sorting member 40 in case of emergency, so as to handle an emergency.

In some embodiments, the article sorting apparatus may further include a third detection means for detecting an article in the sorting member 40, for example, for detecting whether there is an article in the sorting member 40, or obtaining the article information (including a type, a specification, a destination and the like) in the sorting member 40, so as to provide a sorting basis for sorting, move the sorting member 40 to a preset receiving station, and sort an article to the first receiving means 10 or the transfer means 30.

In some embodiments, the article sorting apparatus further includes a first prompt lamp arranged at a slot position of the first bracket 11 corresponding to the first receiving container 12. When a certain first receiving container 12 has received all the articles to be received, the prompt lamp at its corresponding slot position emits light to prompt the operator to take the first receiving container 12 away and replace the same by an empty first receiving container 12.

In some embodiments, the article sorting apparatus further includes a first prompt lamp arranged at a slot position of the second bracket 21 corresponding to the second receiving container 22. When a certain second receiving container 22 has received all the articles to be received, the prompt lamp at its corresponding slot position emits light to prompt the operator to take the second receiving container 22 away and replace the empty second receiving container 22.

Figure 7:
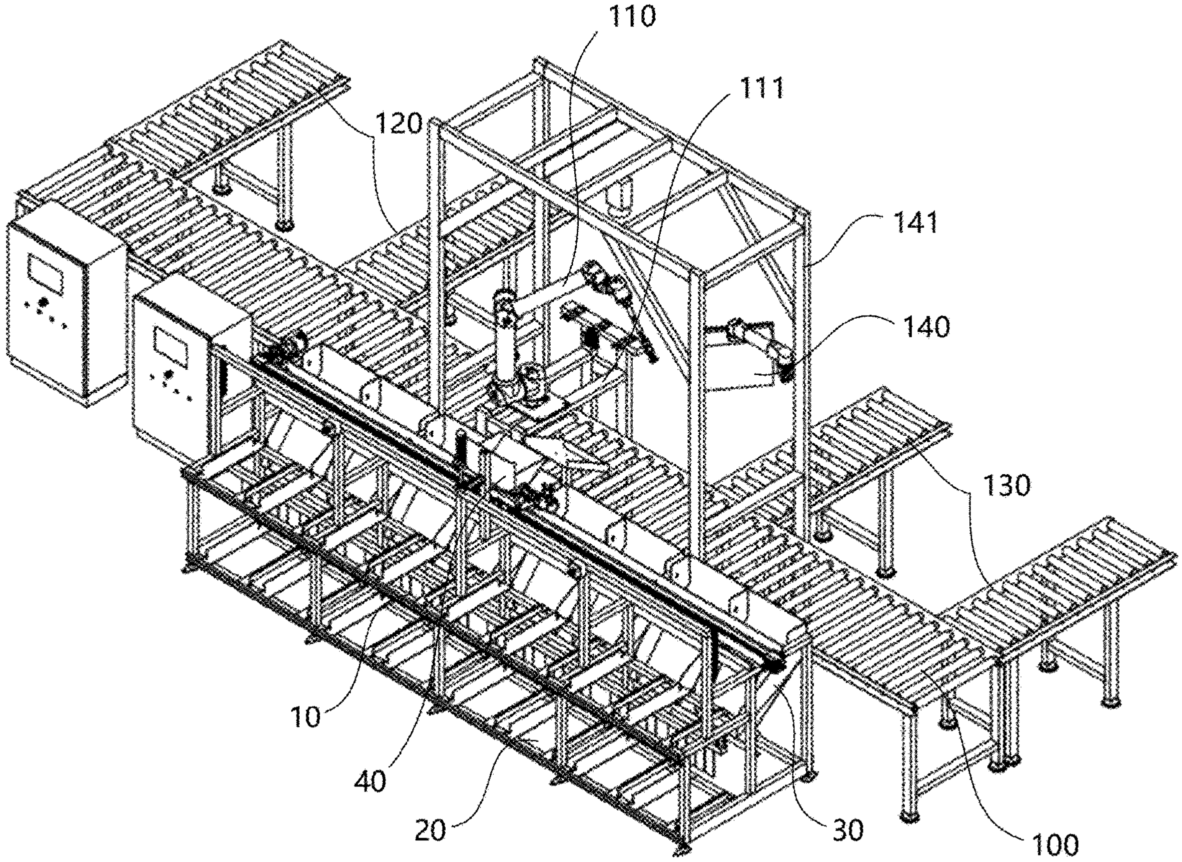
FIG. 7 is a schematic structural view of one embodiment of the article sorting system according to the present disclosure.
Figure 8:
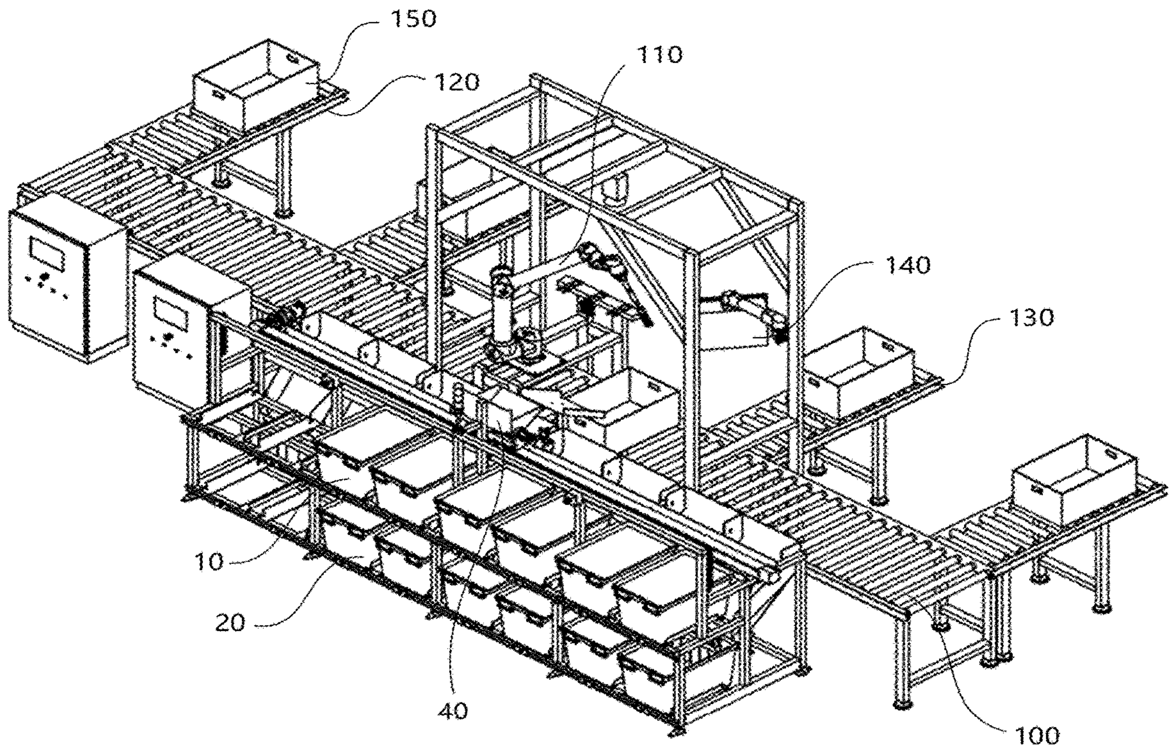
FIG. 8 is a schematic structural view of another embodiment of the article sorting system according to the present disclosure.

As shown in FIGS. 7 and 8, the present disclosure also provides an article sorting system, which comprises the article sorting apparatus in each of the above-described embodiments.

In some embodiments, the article sorting system further comprises a first conveying means 100 for conveying an article to be sorted, and a robot 110 arranged above the first conveying means 100. The article sorting apparatus is arranged on a side of the first conveying means 100, and the robot 110 is configured to transfer an article from the first conveying means 100 to the sorting member 40.

By providing the robot 110 above the first conveying means 100, and providing the article sorting apparatus on a side of the first conveying means 100, the movement distance of the robot 110 is reduced as much as possible, and reduce the time of the robot 110 for single movement, thereby effectively reducing the probability of the article falling from the robot 110 and effectively improving the sorting efficiency.

In some embodiments, the arrangement direction of the plurality of first receiving containers 12 in the article sorting apparatus is parallel to the conveying direction of the first conveying means 100, and it is possible to effectively utilize the space by this arrangement.

In some embodiments, the article sorting system further comprises a second conveying means 120 and a third conveying means 130, which both communicate with the first conveying means 100. The second conveying means 120 is configured to convey a bin 150 for storing an article to be sorted to the first conveying means 100, and the third conveying means 130 is configured to receive the bin 150 from the first conveying means 100.

In some embodiments, the article sorting system further comprises a bin 150, a second conveying means 120 and a third conveying means 130, the bin 150 is configured to store an article to be sorted, and the second conveying means 120 and the third conveying means 130 both communicate with the first conveying means 100. The second conveying means 120 is configured to convey the bin 150 to the first conveying means 100, and the third conveying means 130 is configured to receive the bin 150 from the first conveying means 100.

By means of the second conveying means 120 and the third conveying means 130, it is possible to further improve the automation of the article sorting system, and change a conveying direction of the article by using the second conveying means 120 and the third conveying means 130 at the same time.

Figure 9:
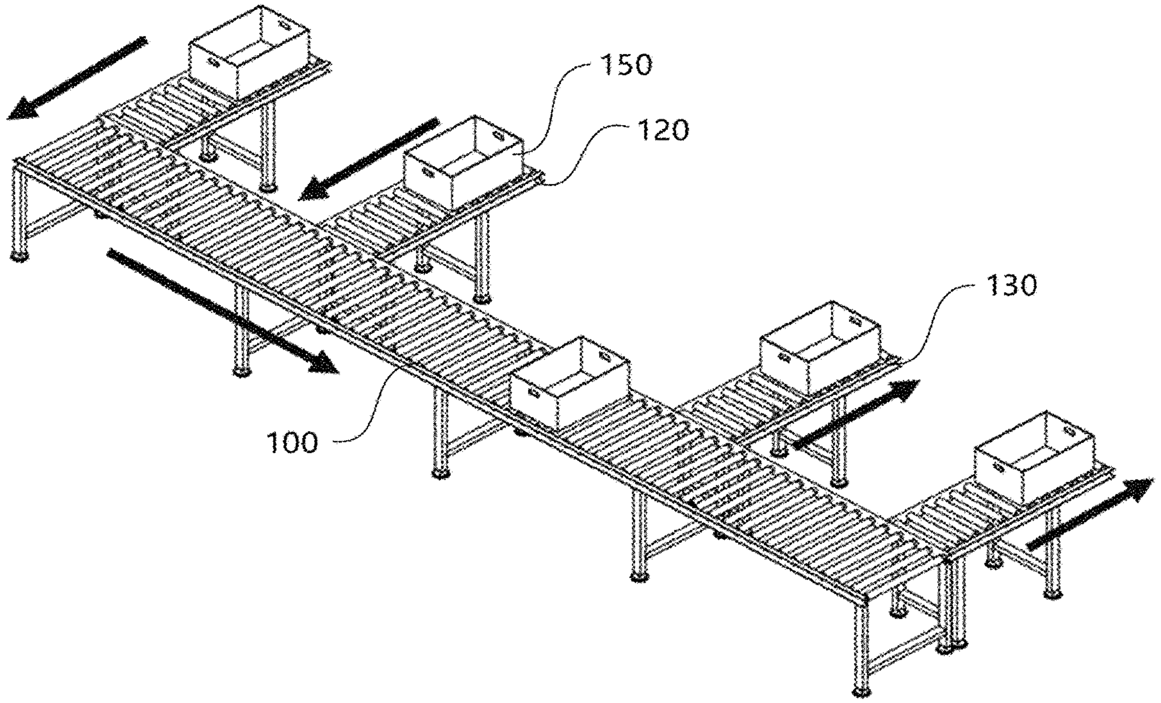
FIG. 9 is a schematic view of a matching structure among the first conveying means, the second conveying means and the third conveying means in one embodiment of the article sorting system according to the present disclosure.

As shown in FIG. 9, in some embodiments, the conveying direction of the second conveying means 120 is perpendicular to that of the first conveying means 100, and the conveying direction of the third conveying means 130 is perpendicular to that of the first conveying means 100, so that it is possible to effectively control a total length of the article sorting system along a conveying direction of the first conveying means 100.

Of course, in other embodiments, the conveying direction of the second conveying means 120 and the conveying direction of the first conveying means 100, and the conveying direction of the third conveying means 130 and the conveying direction of the first conveying means 100 may also have other options, for example, parallel to each other or defining a certain included angle.

The numbers of the second conveying means 120 and the third conveying means 130 may be flexibly set as necessary, for example, one, two, three or more.

In some embodiments, the numbers of the second conveying means 120 and the third conveying means 130 are both two, so that two second conveying means 120 are arranged in parallel, and two third conveying means 130 are arranged in parallel. In this way, it is possible to realize double-entry and double-exit of an article, so that the article may be delivered to the first conveying means 100 through either of the two second conveying means 120, and then output through either of the two third conveying means 130, thereby effectively improving the input and output efficiency of the article, avoiding that the sorting efficiency is reduced due to a shutdown phenomenon of the robot 110 when there are less articles, and also avoiding accumulation on the first conveying means 100 when there are too many articles. When two second conveyors 120 are arranged in parallel and two third conveyors 130 are arranged in parallel, it is possible to optimize the structural arrangement and lessen the overall occupied space of the article sorting system as much as possible.

In some embodiments, two second conveying means 120 and two third conveying means 130 are both arranged in parallel, and the conveying directions of the two second conveying means 120 and the two third conveying means 130 are both perpendicular to that of the first conveying means 100, thereby further optimizing the structural arrangement, facilitating the entry and exit of the article, and facilitating the centralized management of the entry and exit conveying lines at the same time.

In some embodiments, the article sorting system further comprises a second baffle 70 arranged between the article sorting apparatus and the first conveying means 100 for guiding an article that fails to enter the sorting member 40 to the first conveying means 100.

Referring to FIGS. 2 and 7, the second baffle 70 is obliquely arranged between the sorting member 40 and the first conveying means 100. If the article falls before arriving at the sorting member 40, it is possible to return to the first conveying means 100 through the second baffle 70.

Figure 10:
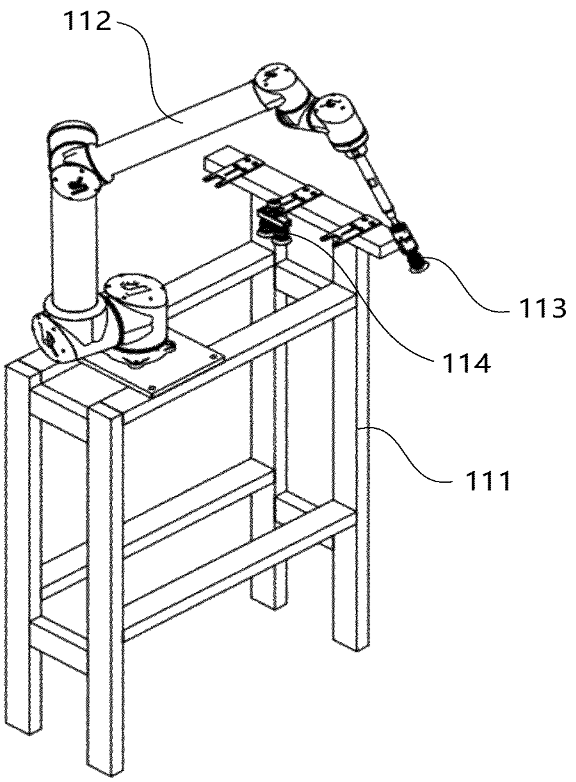
FIG. 10 is a schematic view of a mounting structure of the robot in one embodiment of the article sorting system according to the present disclosure.

In some embodiments, the second baffle 70 includes a fifth plate, and a sixth plate and a seventh plate which are connected to both sides of the fifth plate, the sixth plate and the seventh plate are configured to prevent an article from sliding out from a side. As shown in FIG. 10, the article sorting system includes a second support frame 111, and the robot 110 is mounted on the second support frame 111. The width of the second support frame 111 is greater than that of the first conveyor 100, and the height of the second support frame 111 is greater than that of the first conveyor 100. The top support surface of the second support frame 111 is located above the first conveyor 100, and the robot 110 is mounted on the top support surface of the second support frame 111.

The robot 110 includes a robotic arm 112 and a first end pickup 113 mounted on the head of the robotic arm 112. The first end pickup 113 may grab an article, and the robotic arm 112 drives the first end pickup 113 to move the article. The second support frame 111 is also provided with a plurality of spare second end pickups 114, so that the first end pickup 113 when malfunctioned may be replaced by the second end pickup 114. Alternatively, the first end pickup 113 and the second end pickup 114 have different functions, and different end pickups may be replaced as necessary.

Figure 11:
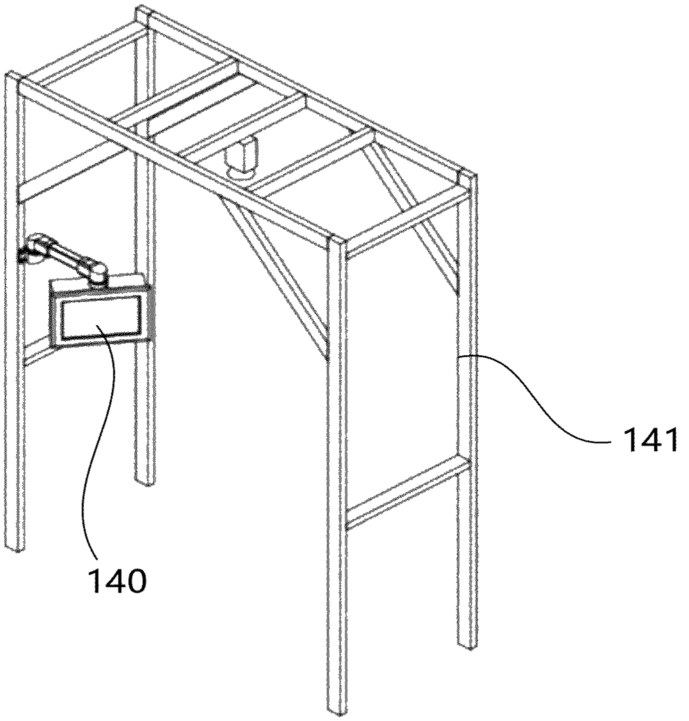
FIG. 11 is a schematic view of a mounting structure of the second detection means in one embodiment of the article sorting system according to the present disclosure.

As shown in FIG. 11, the article sorting system further comprises a third support frame 141 and a second detection means 140 mounted on the third support frame 141. The width of the third support frame 141 is greater than that of the first conveyor 100, the height of the third support frame 141 is greater than that of the first conveyor 100, and the height of the third support frame 141 is greater than that of the second support frame 111. The second detection means 140 is mounted on a side wall of the third support frame 141.

The second detection means 140 may be configured to identify a position of an article in the bin 150, so as to assist the robot 110 in grabbing the article. The second detection means 140 may use a vision camera assembly, which includes a camera assembly, a camera bracket, a display and the like.

The second detection means 140 may also be configured to confirm a sorted article and prompting whether the article has been delivered to the first receiving means 10 or the transfer means 30.

The structure and operation process of one embodiment of the article sorting apparatus and the article sorting system according to the present disclosure will be described below in conjunction with FIGS. 1 to 11:

As shown in FIGS. 1 and 2, the article sorting apparatus includes a first receiving means 10, a second receiving means 20, a transfer means 30, a sorting member 40, a first baffle, a third bracket 61, a second baffle 70, a guide rail 80 and a first detection means 90.

The first receiving means 10 includes a first bracket 11 and a first receiving container 12, and the second receiving means 20 includes a second bracket 21, a second receiving container 22 and a buffer means 23. The buffer means 23 is arranged inside the second receiving container 22. The first bracket 11, the second bracket 21 and the third bracket 61 are connected integrally to form a first support frame. The first bracket 11 is located on the upper layer of the second bracket 21. The third bracket 61 is located at one side of the first bracket 11 and the second bracket 21. The transfer means 30 is mounted on the third bracket 61. The transfer means 30 includes a vertical section 31 and a slanted section 32, the slanted section 32 is connected between the vertical section 31 and the second receiving means 20.

A sensor may be provided at a position on the first bracket 11 where the first receiving container 12 is placed. If the first receiving container 12 is not placed in position, the sensor may detect the abnormality and prompt the abnormality through a prompt lamp.

The guide rail 80 is mounted on the top of the first support frame, and the sorting member 40 is slidably mounted on the guide rail 80. A plurality of first receiving containers 12 are arranged on the first bracket 11, and a plurality of second receiving containers 22 are arranged on the second bracket 21. The plurality of first receiving containers 12 and the plurality of second receiving containers 22 are arranged longitudinally in one-to-one correspondence. The extending direction of the guide rail 80 is parallel to the arrangement direction of the plurality of first receiving containers 12 and the plurality of second receiving containers 22.

A mounting rod is provided above the first bracket 11, and the first baffle 50 and the first detection means 90 are mounted on the first bracket 11. The first baffle 50 is located on one side of the sorting member 40 far away from a receiving port of the transfer means 30, and the first baffle 50 is arranged vertically. The first detection means 90 is configured to detect whether an object enters a movement path of the sorting member 40, and stopping the movement of the sorting member 40 when it is detected that an object enters.

The second baffle 70 is obliquely mounted on the first support frame for guiding an article to return to the first conveying means 100.

The first baffle 50 and the second baffle 70 are arranged between the two first receiving containers 12 and located between the two corresponding second receiving containers 22 at the same time, so as to avoid that the first baffle 50 and the second baffle 70 affect a sorted article in entering the first receiving container 12 and the second receiving container 22.

In the embodiments shown in FIGS. 1 to 4, the structure of the sorting member 40 shown in FIG. 5 is used. The sorting member 40 includes a spindle 41 and a tipping bucket 42 rotatably mounted on the spindle 41, and the tipping bucket 42 has a roughly V-shaped accommodating space. The sorting member 40 further includes an electric motor for driving the spindle 41 to move and a support for mounting the spindle 41, and the support is slidably mounted on the guide rail 80.

In the embodiments shown in FIGS. 1 and 2, the sorting member 40 is in a third state where the tipping bucket 42 is not turned over. In this state, the opening of the sorting member 40 is upward, which is convenient for an article to enter the sorting member 40.

As shown in FIG. 3, the tipping bucket 42 of the sorting member 40 turns over to the first state, and the opening of the sorting member 40 faces towards the opening of the first receiving container 12, so that the article in the sorting member 40 may slide into the first receiving container 12 under the action of gravity.

As shown in FIG. 4, the tipping bucket 42 of the sorting member 40 turns over to a second state, and the opening of the sorting member 40 faces towards the opening of the vertical section 31 of the transfer means 30, so that the article in the sorting member 40 may slide down to the vertical section 31 under the action of gravity, and then is transferred to the second receiving container 22 through the slanted section 32. After the article enters the second receiving container 22 from the slanted section 32, the speed of the article may be reduced under the effect of the buffer means 23, so as to avoid colliding with an interior wall of the second receiving container 22 or other articles located within the second receiving container 22.

In the embodiment shown in FIG. 6, the sorting member 40 includes a conveying body 43 and a conveyor belt 44, and the conveyor belt 44 may move relative to the conveying body 43 along two opposite directions to achieve the object of sorting an article to the first receiving means 10 or the transfer means 30.

As shown in FIGS. 7 and 8, the article sorting system includes an article sorting apparatus, a first conveying means 100, a robot 110, a second conveying means 120, a third conveying means 130, a second detection means 140 and a bin 150.

The article sorting apparatus is arranged in parallel on a first side of the first conveying means 100, and the transfer means 30 is located between the first receiving means 10 and the first conveying means 100. The article sorting apparatus may directly abut against a side of the first conveying means 100 to shorten a distance between the robot 110 and the article sorting apparatus. The second conveying means 120 and the third conveying means 130 are both arranged on a second side of the first conveying means 100. The movement direction of the sorting member 40 in the article sorting apparatus is parallel to the conveying direction of the first conveying means 100. The robot 110 and the second detection means 140 are both arranged above the first conveying means 100.

As shown in FIG. 9, two second conveying means 120 are arranged in parallel, and the conveying direction of the second conveying means 120 is perpendicular to that of the first conveying means 100. Two third conveying means 130 are arranged in parallel, and the conveying direction of the third conveying means 130 is perpendicular to that of the first conveying means 100.

The first conveying means 100, the second conveying means 120 and the third conveying means 130 may be conveyed by a roller, a belt, a chain and the like.

As shown in FIG. 10, the robot 110 is mounted on a second support frame 111, which spans over the first conveyor 100. The first end pickup 113 is mounted on the head of the robotic arm 112, and the second end pickup 114 is arranged on the second support frame 111 as a spare.

As shown in FIG. 11, the second detection means 140 is mounted on the third support frame 141, and the third support frame 141 is higher than the second support frame 111. The second detection means 140 is configured to identify a position of an article in the bin 150, so as to assist the robot 110 in grabbing the article.

The operation process of the article sorting system is as follows: an empty first receiving container 12 is manually placed at an empty slot position of the first bracket 11, and an empty second receiving container 22 is placed at an empty slot position of the second bracket 21, and the receiving container corresponds to a corresponding slot position through the control system. Then, the second conveying means 120 conveys the bin 150 containing an article to be sorted to the first conveying means 100, and the first conveying means 100 conveys the bin 150 below the robot 110. Next, the robot 110 starts a sorting operation according to the position information of the article provided by the second detection means 140. The robotic arm 112 grabs the article from the bin 150 through the first end pickup 113 and places the article into the sorting member 40. The sorting member 40 delivers the article to the first receiving container 12 or the transfer means 30 through overturning or a linear movement. When a certain receiving container completes sorting of an order, there is a light prompt at the slot position of the receiving container. At this time, the receiving container with a completed order may be removed manually and replaced with an empty receiving container, and the empty bin 150 with all the articles that have been withdrawn may exit through the third conveying means 130 to work in turn in a cycle.

In the present disclosure, the sorting member may wait for the robot to drop an article at a fixed position every time, so that each action of the robot has a fixed route, and the article sorting apparatus abuts against a side of the first conveying means, so that it is possible to shorten a distance of the robot as much as possible, and save the movement time of the robot, thereby greatly improving the sorting efficiency. Moreover, since the robot operates in a short path and in a short time, it is possible to reduce the probability that an article is dropped when the end pickup failed to grab the article securely, and improve the operation reliability of the device. In addition, in a meter of the grabbing time, since the movement and delivery of the sorting member, the return of the robot and the grabbing of a new article overlap in time, it is possible to shorten the completion time of a single meter and improve the sorting efficiency.

Finally, it should be noted that: the above-described embodiments are only intended to explain the technical solution of the present disclosure rather than limiting the same. Although detailed explanations are made to the present disclosure in conjunction with preferred embodiments, those of ordinary skill in the art should understand that: it is still possible to make amendments to the embodiments of the present disclosure or equivalent replacements to some of the technical features without departing from the principles of the present disclosure, which shall all be encompassed in the scope of the technical solution for which protection is sought in the present disclosure.

What is claimed is:

1. An article sorting system, comprising an article sorting apparatus, wherein the article sorting apparatus comprises:

a first receiving means for receiving an article;

a second receiving means for receiving an article, wherein the second receiving means is arranged below the first receiving means along a vertical direction;

a transfer means arranged upstream of the second receiving means for transferring a received article to the second receiving means;

a sorting member for sorting the article to the first receiving means or the transfer means; and a first baffle arranged on a side of the sorting member away from a receiving port of the transfer means, for guiding the article deflecting before arriving at the sorting member into the sorting member;

wherein the article sorting system further comprises a first conveying means and a robot, wherein the first conveying means is configured to convey the article to be sorted, the robot is arranged above the first conveying means, the article sorting apparatus is arranged on a side of the first conveying means, and the robot is configured to transfer the article from the first conveying means to the sorting member, the sorting member waits for the robot to drop the article at a fixed position every time;

the article sorting system further comprises a second baffle arranged between the article sorting apparatus and the first conveying means for guiding the article that fails to enter the sorting member to the first conveying means, the second baffle is arranged on a side of the fixed position adjacent to the first conveying means, so as to return the article that falls before arriving at the sorting member to the first conveying means through the second baffle.

2. The article sorting system according to claim 1, wherein a receiving port of the transfer means and a receiving port of the first receiving means are located on both sides of the sorting member respectively at the same height.

3. The article sorting system according to claim 1, wherein the sorting member comprises a spindle and a tipping bucket rotatably mounted on the spindle, and in the case that the tipping bucket rotates to a first state, the article in the tipping bucket slides into the first receiving means; and in the case that the tipping bucket rotates to a second state, the article in the tipping bucket slides into the transfer means.

4. The article sorting system according to claim 1, wherein the sorting member comprises a conveying body and a conveyor belt, wherein the conveyor belt conveys the article along a straight line, the conveyor belt moves along a first direction to convey the article to the first receiving means, and the conveyor belt moves along a second direction opposite to the first direction to convey the article to the transfer means.

5. The article sorting system according to claim 1, wherein the transfer means comprises a vertical section and a slanted section communicating with each other, wherein the slanted section communicates with the second receiving means.

6. The article sorting system according to claim 1, wherein the article sorting further comprises a buffer means for reducing an impact force after the article arrives at the second receiving means.

7. The article sorting system according to claim 6, wherein the buffer means comprises a mounting frame and a plurality of flexible belts mounted on the mounting frame.

8. The article sorting system according to claim 1, wherein the first receiving means and the second receiving means are provided with a plurality of receiving stations sequentially arranged along a horizontal direction respectively, and the sorting member is movably arranged relative to the first receiving means and the second receiving means along a horizontal direction, so that the sorting member sorts the article to any one of the receiving stations of the first receiving means and any one of the receiving stations of the second receiving means.

9. The article sorting system according to claim 1, wherein the article sorting further comprises a first support frame and a second support frame located below the first support frame, wherein a plurality of first receiving containers for receiving the article are arranged on the first support frame, so that the plurality of the first receiving containers and the first support frame form the first receiving means; and a plurality of second receiving containers for receiving the article are arranged on the second support frame, so that the plurality of second receiving containers and the second support frame form the second receiving means.

10. The article sorting system according to claim 9, wherein the first support frame further comprises a third bracket arranged on a side of the first support frame and the second support frame, the transfer means is arranged on the third bracket, and the sorting member is arranged on the top of the third bracket.

11. The article sorting system according to claim 1, further comprising a second conveying means and a third conveying means, which both communicate with the first conveying means, the second conveying means is configured to convey a bin to the first conveying means, the bin is configured to store the article to be sorted, and the third conveying means is configured to receive the bin from the first conveying means.

12. The article sorting system according to claim 11, wherein the numbers of the second conveying means and the third conveying means are both two, two of the second conveying means are arranged in parallel, and two of the third conveying means are arranged in parallel.

* * * * *